United States Patent [19]
Brady

[11] 3,985,320
[45] Oct. 12, 1976

[54] PLATFORM STABILIZING SYSTEMS
[76] Inventor: de Cordova Maxwell Brady, Box 1111, Hurst, Tex. 76053
[22] Filed: May 19, 1975
[21] Appl. No.: 578,514

[52] U.S. Cl. ................................ 244/93; 114/124; 74/5.41; 244/12 C; 244/79
[51] Int. Cl.² .................... B64C 17/00; B64C 17/06
[58] Field of Search ............ 244/23 C, 12 C, 12 A, 244/17.11, 79, 93, 165, 94, 17, 13, 95; 114/124; 74/5.6, 5.8, 5.41, 4.47; 180/116–118

[56] References Cited
UNITED STATES PATENTS

| | | | |
|---|---|---|---|
| 1,021,116 | 3/1912 | Ure | 244/79 |
| 1,818,104 | 8/1931 | Sperry | 244/93 |
| 1,853,069 | 4/1932 | Minorsky | 114/124 |
| 1,883,414 | 10/1932 | Sears et al. | 244/93 |
| 2,790,119 | 4/1957 | Konet et al. | 74/5.6 D |
| 2,958,305 | 11/1960 | Montrose-Oster | 114/124 |
| 2,961,189 | 11/1960 | Doak | 244/12 A |
| 3,228,420 | 1/1966 | Phillips | 244/23 C |
| 3,432,120 | 3/1969 | Guerrero | 244/93 |
| 3,511,454 | 5/1970 | Hamilton | 244/79 |
| 3,765,622 | 10/1973 | Haines | 244/17.11 |

Primary Examiner—Stephen G. Kunin
Assistant Examiner—Galen L. Barefoot
Attorney, Agent, or Firm—Wofford, Felsman, Fails & Zobal

[57] ABSTRACT

Apparatus for stabilizing a platform characterized by a frame carrying a stabilizing gyroscope that includes a substantially horizontal rotor with its shaft fixed with respect to the frame so as to effect a precessing force 90° in the direction of rotation responsive to a torque force on the shaft in any azimuthal direction in a horizontal plane; a shifting carriage for shifting a load carrying compartment to move its center of gravity with respect to the frame to a plurality of successive second locations to offset to a desired degree a torque force and the reactive precessing force; and a control device for detecting a slight change in attitude from a desired attitude and effecting via the shifting carriage a controlled shifting of the load carrying compartment to a new second location to reestablish the desired attitude. The invention is readily applicable to vertical take-off and landing craft or other platforms having a lifting device connected therewith.

9 Claims, 12 Drawing Figures

Fig. 1
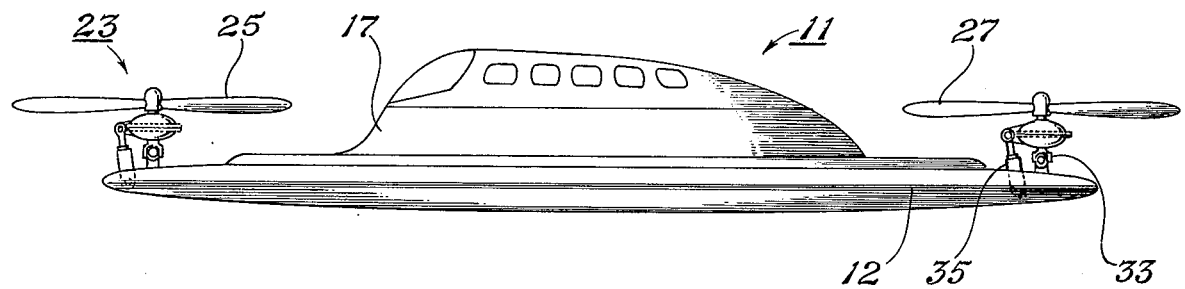
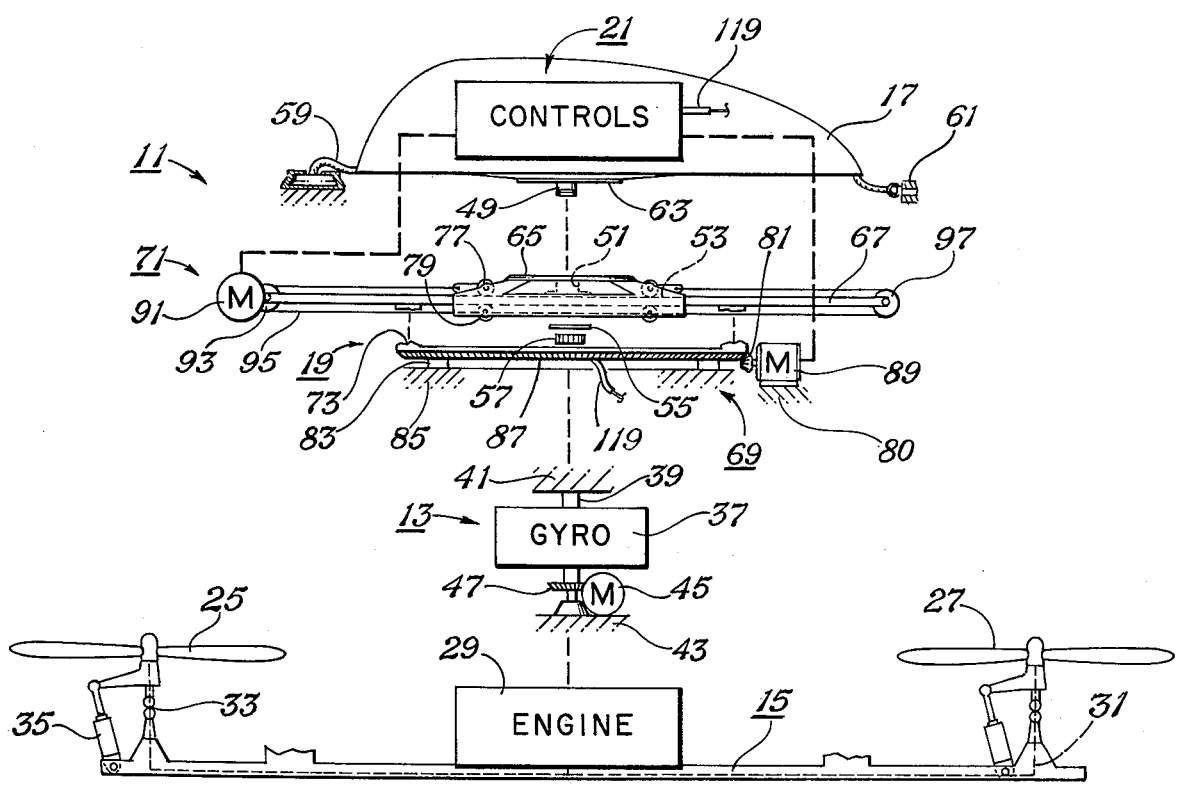
Fig. 2
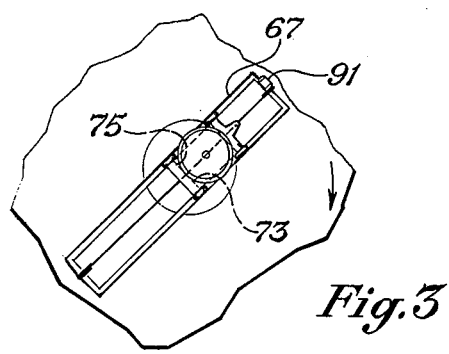
Fig. 3
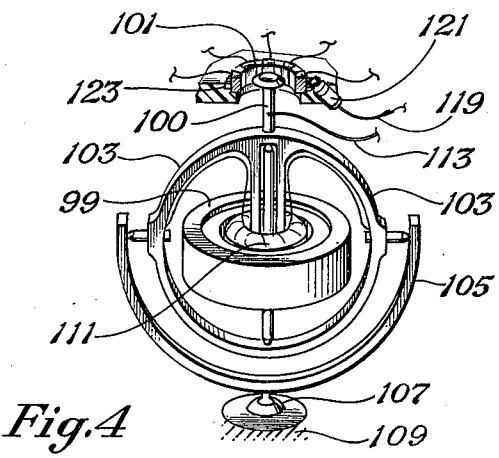
Fig. 4

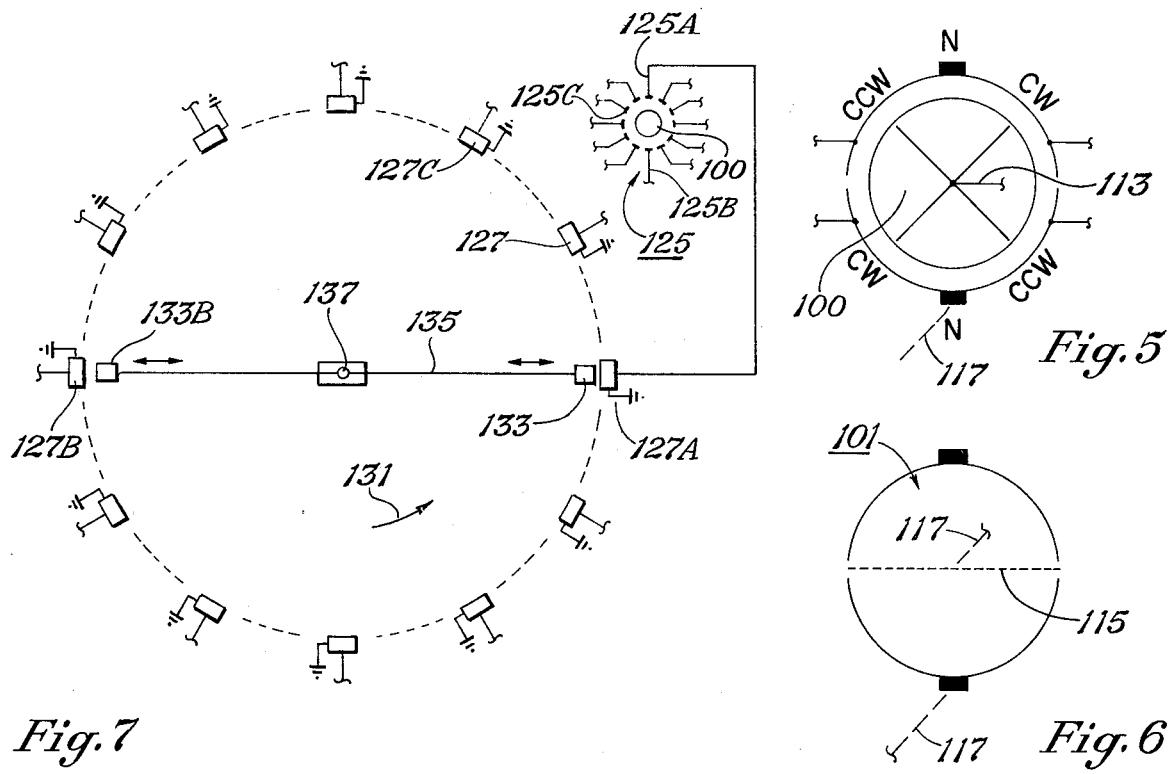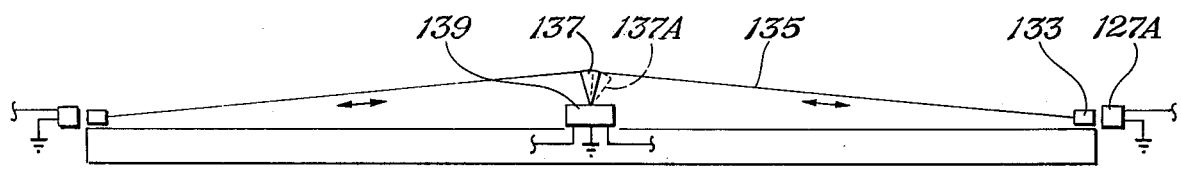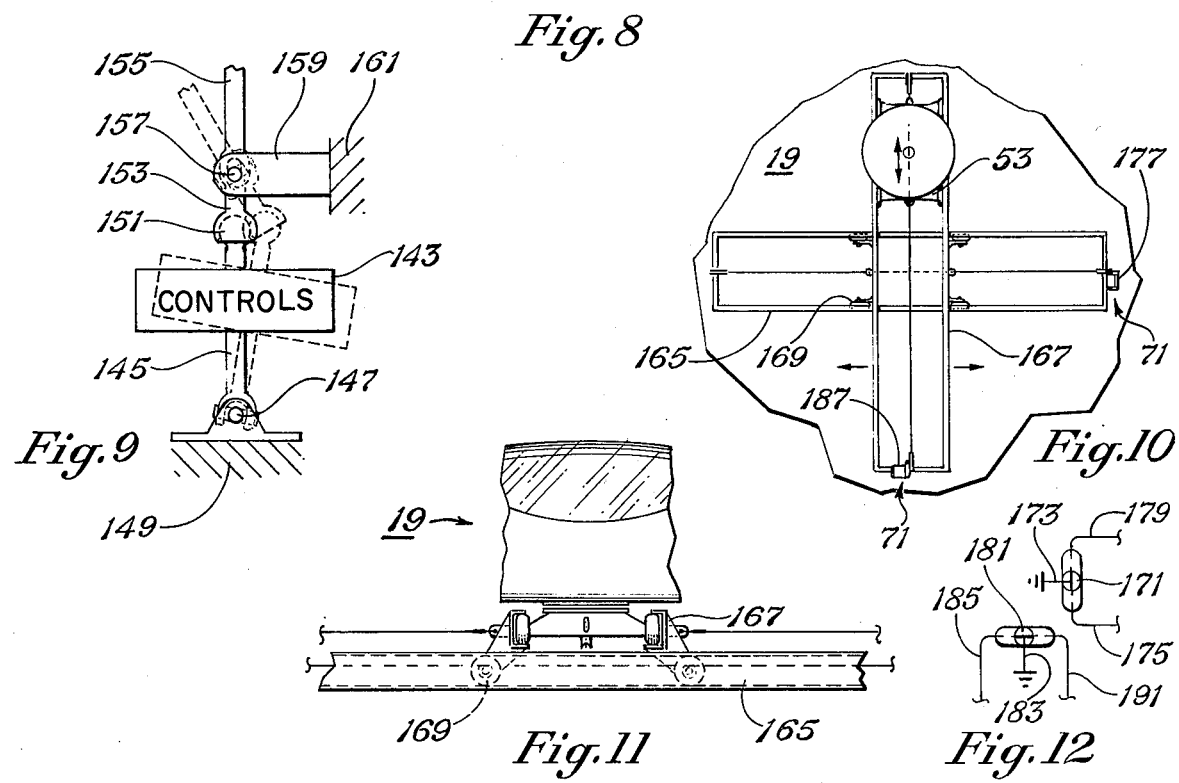

PLATFORM STABILIZING SYSTEMS

BACKGROUND OF THE INVENTION

1. Field of the Invention

This invention relates to systems for stabilizing platforms; such as, gun-firing platforms on tanks, ships and the like; and platforms having a lifting means connected therewith; such as, vertical take-off and landing craft.

2. Description of the Prior Art

Heretofore, gyroscopes, or gyros, have been used to stabilize ships, trains, planes, cars tanks, gun-firing platforms and the like; but the only ones ever used stabilized only in two directions, and not in all azimuthal directions in a horizontal plane at once. Particularly, the prior art did not employ a universally stabilizing gyroscope in a combination that was practical. Vertical take-off and landing craft have particularly needed such a practical stabilizing system, since they have required a high degree and constancy of attention by a skilled pilot; and have required modifying the lifting force for stabilization; for example, changing of pitch of rotor blades to compensate for increased lift that would otherwise occur during the forward traverse of the blade compared to the rearward traverse of the matching blade. Both the blades and pitch changing apparatus has been very expensive.

Thus, the prior art has failed to provide apparatus that would fully use the advantages of the gyro in all azimuthal directions, or directions of the compass, and that could be widely employed.

Moreover, the prior art has not provided a vertical take-off and landing craft that could employ conventional propellor blades instead of the extremely expensive rotor blades and the pitch adjusting means for continuously adjusting the pitch of the rotor blades during the forward movement of the blade as contrasted with rearward movement of the blade in its rotation about an axis disposed within the craft.

SUMMARY OF THE INVENTION

Accordingly, it is an object of this invention to provide apparatus that advantageously employs a stabilizing gyro to compensate for undesired attitudinal changes in all azimuth directions.

It is also an object of this invention to provide apparatus that makes practical use of a conventional propelling means, such as powered propellers or jet engines, in vertical take-off and landing craft, and stabilizes the platform, per se; instead of modifying the lifting means, such as requiring the pitch adjusting means for continuously adjusting the pitch on a rotor blade during forward movement as contrasted with the rearward movement of the rotor blade.

In accordance with this invention, a stabilizing gyro is securely mounted, without gimbals, onto a frame to be stabilized and the precession of the gyro is neutralized by use of a shifting means to relocate the center of gravity of a load carrying compartment so as to reverse the torque on the axis of rotation of the stabilizing gyro. A control means is employed to detect the digression of the frame of the platform from a desired attitude and through action of a shifting means relocate the center of gravity of the load carrying compartment to effect a return to the desired attitude. Enhanced stability, as well as economy, is effected.

BRIEF DESCRIPTION OF THE DRAWINGS

FIG. 1 is a side elevational view of one embodiment of this invention in the field of vertical take-off and landing craft.

FIG. 2 is a partial exploded view, partly schematic, of the embodiment of FIG. 1.

FIG. 3 is a partial plan view from the top of one embodiment of the shifting means of FIG. 2.

FIG. 4 is a isometric view, partly in section, of a gyroscope and shaft extension that is suitable for use as a control gyro in this invention.

FIGS. 5 and 6 are schematic views from the top illustrating the principle of the employment of the control gyro in obtaining a desired azimuth for shifting the center of gravity.

FIGS. 7 and 8 are, respectively, top plan and side elevational views, partly schematic, showing apparatus for determining the direction in which the center of gravity is to be shifted along an attained azimuth.

FIG. 9 is a partial block diagram of another embodiment of the invention employing the controls as craft controls for effecting banking and the like.

FIGS. 10 and 11 are partial top plan and side elevational views, respectively, of another embodiment of a shifting means that may be employed in this invention.

FIG. 12 is a partial plan view of respective sets of mercury switches that can be employed for controls for the shifting means of FIGS. 10 and 11.

DESCRIPTION OF PREFERRED EMBODIMENTS

The principle of this invention may be illustrated clearly with respect to a vertical take-off and landing craft. Moreover, it is in this application that it has its most immediate and significant economical rewards since it enables employing conventional aircraft propelling means instead of the expensive helicopter rotors with a means for continuously changing the pitch of the rotor depending upon whether it is rotating in the forward direction or in the rearward direction during different portions of its rotational trajectory during flight of the craft. Herein, the term "horizontal" is employed in its engineering sense of meaning substantially horizontal, as distinguished from being vertical. Accordingly, the invention will be described with respect to a vertical take-off and landing craft such as illustrated in FIGS. 1 and 2. Therein, the apparatus 11 for stabilizing a platform 12 comprises a stabilizing gyroscope 13; a frame 15 carrying the stabilizing gyroscope 13 at a set first location; a load carrying compartment 17; a shifting means 19 for shifting the load carrying compartment to move its center of gravity to a plurality of successive second locations with respect to the frame 15; and a control means 21 for detecting a slight change in attitude of the apparatus 11 and effecting a controlled shifting of the load carrying compartment to a new second location to re-establish the desired attitude.

As illustrated, the platform 12 has connected thereto lifting means 23 in the form of power tiltable reaction devices for effecting lift for vertical take-off and landing in response to flow of air therepast. Specifically, the lifting means 23 comprise powered, tiltable conventional propellors 25 and 27. The propellors 25 and 27 may be driven by individual engines or, as illustrated by a single engine 29 located amidships and connected with the respective propellors 25 and 27 via a conventional drive means, shown by dashed line 31, FIG. 2.

The propellors are pivotally mounted about respective universal joints 33 and are retained at the desired angle by suitable power tilting means, such as hydraulic rams 35. The universal joints may be constrained to tilt only along the longitudinal axis of the aircraft if desired, or they may be tiltable either along the horizontal or lateral axes with the respective hydraulic rams 35 disposed longitudinally and laterally thereof for obtaining and retaining the desired relative angle between the axis of rotation of the propellors and the platform 12. Conventional helicopter controls are employed to effect the desired attitude of the propellors. Accordingly, there is no need to encumber this application with the detailing of those well known controls herein, particularly since they are not being claimed, per se.

The stabilizing gyroscope 13 includes a horizontal rotor 37, FIG. 2, mounted on its shaft 39. The shaft 39 is suitably journalled in fixed supports 41 and 43. The supports 41 and 43 are fixedly connected with the frame 15 at the first location such that the axis of the rotor of the gyroscope is fixed with respect to the frame so as to effect a precessing force 90° in a direction of rotation of the rotor 37 responsive to a torque force on the axis of rotation, or shaft 39, in any direction in a horizontal plane, from zero degrees to 360°; such as would be effected by a change in attitude of the craft, or platform 12. Any other method of fixing the gyro, such as rotation about a fixed spindle, could be employed as long as the stabilizing gyro is maintained in a fixed attitude with respect to the attitude of the platform. Rotation of the gyro 13 is effected by suitable means, such as electric motor 45 driving suitable mated gears, illustrated by bevelled gear 47. Any of the other well known means of driving the rotor 37 may be employed. The mass of the gyro 13 may be as little as 1 percent of the mass of the craft, or platform 12 and still effect the requisite precessional forces for stabilized operation. To exemplify this force, if there is a tendency of the nose of the craft to be lifted upwardly, the force on the ends of the shaft 39 of the rotor 37 will be converted by precession into a bank to the right if the rotor is rotating counterclockwise as viewed from the top or a bank to the left if the rotor is rotating clockwise. The change in attitude of the platform is manifested as a result of the precessional force, rather than the torque inducing force. This manifestation will become clear with respect to the controls hereinafter.

The frame 15 comprises a more or less conventional airworthy frame for the platform 12. In FIG. 2, the frame is shown discontinuous with the conventional symbol of the incomplete lines to show the fixed points and supports that are fixedly connected with the frame 15. The exact shape of the frame will depend upon the dimensions of the load carrying compartment longitudinally and laterally, of the platform; and upon the function being performed; whether carrying passengers or cargo. Members of the frame will be structurally adequate to enable the load to be lifted by the lifting means 23 and manuvered as desired responsive to more or less conventional controls operated by a pilot.

The load carrying compartment, or section, 17 is illustrated as a combination passenger and cargo carrying compartment, such as might be employed for ferrying personnel and their luggage. Internally, it may comprise any of the more or less conventional types of compartments and will, of course, be less elaborate, such as an open area or section, if only freight is being ferried. As illustrated, the load carrying compartment 17 is connected with a main central support 49 that is journalled for relative rotational movement with respect to a socket 51 in a carriage 53. If desired, the main support 49 may be retained in socket 51 by suitable securing means, such as washer 55 and nut 57. The load carrying compartment 17 is prevented from rotating movement by suitable means, such as tethers 59 connected with it and with fixed supports 61 at at least one point. The fixed supports 61 are fixedly connected with the frame 15. The tethers 59 are of spongee cord, although other strong but flexible and elastic lineal members may be employed. The weight of the load carrying compartment 17 is borne by mating engagement of planar discs 63 and 65 located, respectively, on the bottom of the load carrying compartment 17 and the top of the carriage 53. Suitable lubricant, such as grease, may be employed to facilitate the relative rotational movement between the stationary disc 63 and the rotatable disc 65. If desired, an intermediate disc with suitable roller bearings or the like can be employed to facilitate relative rotational movement at cold temperatures.

The sizes of the respective elements in the load carrying compartment will vary depending upon the application. In a typical application as illustrated, the load carrying compartments 17 may have a diameter of from 12 to 15 feet and have a diameter of the central planar discs of from about 1 to 3 feet.

The shifting means 19 is provided for shifting the center of gravity of the load carrying compartment to a plurality of second locations with respect to the frame to offset to a desired degree a torque force and a reactive precessing force, as indicated hereinbefore. The shifting means 19 carries the load carrying compartment 17 and is, in turn, carried by the frame 15. As illustrated in FIGS. 2 and 3, the shifting means 19 includes a track means, such as track 67; an azimuth orienting means 69 for orienting the track at a desired azimuth; and a longitudinal moving means 71 for moving the load carrying compartment in both directions longitudinally of the track 67.

The track means is illustrated as a pair of tracks that are carried by the azimuth orienting means 69 via members 73. While any suitable support structure may be employed, the illustrated members 73 are connected into H cross beams 75, FIG. 3. The tracks 67 may assume any type of track appropriate to a transporting means, such as wheels or lubricated slides, on a carriage 53, FIG. 2. For example, the tracks may comprise U-beams, such as illustrated in FIG. 11, with the wheels of the carriage disposed within the track. On the other hand, each track may comprise a simple beam with two sets of wheels 77 and 79, disposed, respectively, above and below the track, as illustrated in FIG. 2. In any event, the track has sufficient structural strength to support the load of the carriage 53 and the load carrying compartment 17. Ordinarily, it will not be necessary to move the carriage 53 toward the extremity of the track, since adequate adjustment can be obtained by moving the carriage such that the center of support, typified by the main central support 49, does not pass beyond the supporting members 73. The track means carries the carriage 53 and the carriage 53 carries the load carrying compartment 17; and the track means is carried by the azimuth orienting means 69.

The azimuth orienting means 69 comprises a rotatably mounted turntable 87 and a means for effecting rotation of it; such as, the motor 89 and the respective driven and driving bevelled gears 81. The motor 89 is connected with a fixed support 80 so as to effect rotation of the turntable 87 without movement of the motor 89 with respect to the frame 15. The turntable 87 is suitably supported as by bearings 83 engaging a race in fixed supports 85. Preferably, the bearings 83 have an overhanging interlock with the fixed support 85 so as to prevent inadvertent relative vertical motion therebetween, as could occur in turbulence. As illustrated, the motor 89 drives a small bevelled gear that engages the much larger bevelled gear disposed at the periphery of the turntable so as to orient the turntable and the track 67 that it carries at any desired azimuth from zero degrees to 360°, zero degrees being the forward nose of the ship, or platform 12.

The longitudinal moving means 71 comprises the carriage 53 with its sets of wheels 77 and 79 and means for moving the carriage longitudinally of the track 67. As illustrated, the means for moving the carriage comprises an electric motor 91 driving a sheave 93 that drivingly engages a cable 95. The cable 95 is connected at each end of the carriage 53 and traverses via idler pulley 97 the length of the track 67. Thus, when the sheave 93 is rotated in one direction, the carriage 53 is pulled longitudinally along a particular direction of the track. When the reversible motor 91 is reversed and rotates the sheave 93 in the opposite direction, the carriage is moved in the opposite direction. For heavier loads, chains, and power and idler sprockets may be employed, instead of the cable and power sheave and idler pulley.

Both the motors 89 and 91 are reversible and are responsively connected with the controls 21, as indicated by the respective dashed lines and as will become clearer from the descriptive matter hereinafter with respect to the controls. Thus, it can be seen that the track may be rotated to orient it along any desired azimuth responsive to rotation of the motor 89 and the carriage may be pulled longitudinally of the track responsive to a particular direction of rotation of motor 91 so as to position the center of gravity of the load carrying compartment 17 as indicated by the controls 21; all without rotational movement of the load carrying compartment 17 that is tethered to the frame 15. Both the controls 21 and the electric motors 89 and 91 are designed and connected to effect positioning of the center of gravity with the least possible waste motion and without unduly disrupting the attitude of the aircraft or requiring unnecessary control.

The control means 21 comprises a universally movably mounted gyroscope 99, FIG. 4, having an extension 100 that has an electrically conductive periphery for effecting a completed circuit and a signal upon touching a contact. The control means 21 includes a set 101 of a plurality of contacts and null points for effecting the desired azimuth orientation of the track means. The control means 21 includes a second set of electrical contacts that are disposed circumferentially about an extension of a universally mounted gyroscope for effecting movement of the load carrying compartment in a direction displaced 90° from the precession, in the direction of spin, so as to compensate for the effect of precessional force of the stabilizing gyroscope 13.

The one or more gyroscopes 99 that are employed are conventional gyroscopes mounted in three gimbal rings, or equivalent, so that the gyroscope can maintain its position in space regardless of the attitude of the craft. As illustrated in FIG. 4, the gyroscope 99 is mounted in the first and second gimbal rings 103 and 105; the second gimbal ring 105 being mounted via a ball and socket joint 107 to a fixed support 109. Thus, the gyroscope 99 is universally movably mounted in the sense that it can maintain its position in space regardless of the attitude of the craft, or platform 12. Preferably, two universally mounted gyros are employed, one for effecting the desired azimuth and one for effecting the desired direction of movement of the carriage 53 along the tracks 67. In the illustrated gyro in FIG. 4, an integrally formed electric motor 111 maintains the desired rate of rotation with minimal resultant precession. The extension 100 is illustrated as an extension of the shaft of the gyroscope 99 and often is referred to hereinafter as "shaft extension". It is connected with a first electrical conductor 113 such that as the peripheral portion of the top makes electrical communication with the respective contacts in the set of contacts 101, a completed circuit is made. As can be seen in FIG. 5, two null points N are provided. Contact of the shaft extension 100 with the set of contacts at point N indicates that the correct azimuth has been effected, but that the movement of the center of gravity along the tracks 67 has not yet been effected. Accordingly, no further rotation of the motor 89 is effected. If, on the other hand, the extension 100 touches one of the contacts labeled CW, the motor 89 is rotated so as to effect clockwise rotation of the turntable 87 and the track 67 to bring it to the proper azimuth in the shortest possible degree of movement. Similarly, if the extension 100 touches one of the contacts labeled CCW, the motor 89 is caused to rotate in the opposite direction to rotate the turntable and the track 67 in a counter clockwise direction to achieve the proper orientation most rapidly. Expressed otherwise, a contact of the extension 100 at any contact other than that represented by N effects rotation of the orienting means in one direction or the other to position the tracks at the proper azimuth. If contact is made with the contact labeled N, however, the circuit to the servo motor is broken and the brakes are set to stop rotation at the desired azimuth. As illustrated schematically in FIG. 6, the set 101 of contacts is slaved, or synchronized, to the tracks such that the dashed line 115 is always parallel in azimuth with the tracks. A mechanical interconnection that makes this synchronization possible is illustrated by the dashed line 117. Synchronization is easy if the controls are mounted on the tracks such that they are merely oriented by the tracks. As illustrated, however, a flexible cable interconnection 119, FIGS. 2 and 4, is employed to maintain the synchronized orientation. As illustrated in FIG. 4, a suitable gear within housing 121 effects rotation of the set 101 of contacts by way of suitable circular rack 123. Expressed otherwise, the set of contacts are connected with the track means in a follower relationship so as to maintain the same azimuth orientation with respect to the track means as the track means rotate. In addition, the set 101 of contacts are connected with the frame 15 so as to be responsive to change in attitude of the frame 15, or platform 12.

The second set of electrical contacts that are disposed circumferentially around an extension of a universally mounted gyroscope is illustrated schematically in FIG. 7. Therein, the extension 100, which may or may not be the same as the extension 100 of FIG. 5, is surrounded by the second set 125 of contacts. Each of the contacts in the set 125 of contacts is connected with a switch means via a suitable switch moving means 127 displaced 90° with respect to the relative position of the individual contact. As illustrated in FIG. 7, the contact 125A, located at zero degree, is connected with the switch moving means 127A located at 90° when the stabilizing gyroscope 37 is rotating in the counterclockwise direction, as indicated by the arrow 131. Thus, generically, the switch moving means is displaced with respect to its contact 90° in the circular direction opposite the direction of rotation of the stabilizing gyroscope 37. For example, if a force occurred on the craft which tended to effect a bank to the left, or a raising of the right side of the platform 12, the precession force would manifest this force as a raising of the nose of the aircraft causing the shaft extension 100 to touch contact 125A. The contact 125A would then complete an electrical circuit to energize the solenoid serving as the switch moving means 127A. Energization of the solenoid 127A would then pull the bob 133 toward it, or to the right as illustrated. The bob 133 is connected by way of suitable lineal member 135 with toggle 137 of switch 139. Thus, energization of the solenoid 127A will pull the toggle 137 to the right, indicated by dashed lines 137A, FIG. 8, to cause the motor 91 to move the carriage 53 toward the 90° position of FIG. 7 to counteract the original and the precessional forces. Thus, when the track has been turned to achieve the desired azimuth, the bob 133 on the track will be pulled toward the solenoid serving as the switch moving means 127 to move the toggle 137 in a particular direction with respect to the track. As illustrated in FIGS. 7 and 8, the toggle would have been moved to the right to move the carriage 53 to the right. Conversely, however, if the bottom contact 125B had been touched, the switch moving means 127B at 270° would be energized to pull the bob 133B toward it to effect movement of the load carrying compartment to the left in FIG. 7. By this instrumentation, the shortest and most direct movement of the center of gravity of the load carrying compartment 17 is effected to return the platform 12 to its desired attitude. Moreover, with this arrangement, spurious movement of the carriage 53 along the track 67 is prevented, since there is no signal given until the proper orientation of the track 67 has been achieved so as to emplace the bob 133 at the end of the track adjacent the switch moving means 127 that is displaced 90° from the contact 125 that is touched by the shaft extension 100.

In operation, the pilot starts his engines and employing the usual controls manuevers the ship from the ground, effecting gradual tilting of the propellors 25 and 27 to obtain the requisite forward velocity component. In the event that there is an unbalanced force tending to effect a change of atitude from that desired, the force will be manifested as precessional force, because of the large precessional force of the highspeed stabilizing gyro 37. The displacement 90° in the direction of rotation of the rotor 37 will then be sensed by the respective instrument gyroscopes by the touching of the shaft extensions 100 with the respective contacts 101 and 125. For example, if the shaft 100 touches the contact CW, the motor 89 rotates the turntable in the clockwise direction until the shaft extension 100 touches a null point labeled N. In the meantime the shaft extension 100 will have contacted one of the direction indicating contacts in the set 125 and completed an electrical circuit to a solenoid 127 displaced 90° with respect to the contact 125. The direction of displacement is in the opposite direction to the direction of rotation of the gyroscope 37, as explained hereinbefore with respect to FIG. 7. Thus, the motor 91 is energized to move the load carrying compartment in the direction to tend to restore the attitude without requiring compensation by the pilot and without requiring expensive automatic pitch changing means for changing the pitch on the blades employed in the lifting means 23.

By employing this invention, a much less expensive blade and pitch changing means can be employed. Moreover, much less work is required of the pilot with consequent less fatigue and greater safety factor than where the pilot is having to continuously adjust small variations in change and attitude of his craft.

In the embodiment described hereinbefore, the controls were rigidly connected with the frame so as to reflect a departure in attitude of the frame. If desired, however, the controls may be mounted in a pivotally mounted compartment, or cabinet, 143, FIG. 9. As illustrated, the cabinet 143 is mounted on a "control stick" 145 that is universally pivotally mounted via joint 147 mounted on a fixed support 149. The control stick 145 is connected at its other end 151 in a universal joint with a lowermost extension 153 of the "pilot's control stick" 155, that is pivotally mounted in a universal fulcrum joint 157. The fulcrum joint 157 allows vertical movement via a slotted structure to prevent binding. It is connected by a bracket 159 with a fixed support 161. Thus, when the pilot desires to effect a movement such as moving the nose of the aircraft upwardly or downwardly, or a bank to the right or the left, he need only move his control stick in the conventional fashion. This movement is translated into a reverse movement of the control box 143 and is sensed as a change in attitude of the platform 12 by the controls 21. Consequently, the load carrying compartment is shifted to counter this move and, in fact, effects the desired control indicated by the pilot. Assume, for example, that the pilot wished to execute a diving bank to the left. Thus, he would push the stick forward and to the left as in a conventional control. This would be reflected by a movement of box 143 oppositely and would touch the contact CCW with the shaft 100 to effect a counter clockwise movement of the track in FIG. 7. Simultaneously, the shaft extension 100 would touch a contact 125C to energize the switch moving solenoid 127C. Consequently, when the track had been oriented to position the bob 133 adjacent solenoid 127C, the toggle 137 would be pulled forwardly and to the right to move the load carrying compartment forward and to the right to effect a torque on the shaft 39 of the stabilizing rotor 37. This torque would then be reflected as a force effecting downward and to the left change in attitude of the aircraft.

FIGS. 10 and 11 illustrate another embodiment that is satisfactory for use as the shifting means 19. Therein, a first track 165 traverses from port to starboard on the craft, or platform 12, parallel to the horizontal rotor of the stabilizing gyro 37. The track 165 is composed of heavy duty members that are securely affixed to the platform 12 and that carry a second track 167 oriented at 90° with respect to the first track. Specifically, the second track 167 is carried by a plurality of wheels 169 that are engaged in the first track 165, which is illustrated as a U-channel. The second track 167 traverses fore and aft of the platform 12 and parallel with the horizontal rotor of the stabilizing gyro 37. The wheels 169 are located at approximately the midpoint of the second track 167 for most nearly balanced operation. The second track 167 is moved sideways of the platform. A suitable longitudinal moving means 71 is employed, similarly as described hereinbefore. The second track 167 carries a carriage 53 with a longitudinal moving means 71 similarly as described hereinbefore. The carriage 53, in turn carries the load carrying compartment 17. Thus, there are rollers that roll along the first track 165 to move the second track 167 laterally of the platform 12 and rollers to move the carriage 53 and the load carrying compartment 17 longitudinally of the second track 167 and longitudinally of the platform 12.

The respective longitudinal moving means comprise reversible electric motors, and respective cables, power sheaves, and idler pulleys, as described hereinbefore. Thus, it can be seen that by proper xy coordinate positioning of the carriage through the respective movements longitudinally of the first track 165 and the second track 167, any desired second location can be obtained for positioning the center of gravity of the load carrying compartment. Movement along the respective tracks in a particular direction is effected responsive to sets of respective mercury switches having their longitudinal axes oriented in the desired directions along the longitudinal and lateral axes of the platform 12, as illustrated in FIG. 12. Thus, the particular direction of movement along the tracks will be determined by the movement of the mercury toward one or the other of the ends and the respective contacts inside the mercury switches. The same functional movement to compensate for the precessional force that is manifested will be employed as has been described hereinbefore. Thus, a force tending to cause a bank to the left will be manifested as a precessional force that tends to raise the nose of the platform, if the stabilizing gyroscope has a counterclockwise rotation as viewed from above. Consequently, the drop of mercury 171, FIG. 12 will close the circuit between the conductor 173 and the conductor 175. The conductor 175 is connected with the motor 177, FIG. 10, so as to effect movement of the second tracks 167 to the right. This would tend to neutralize the torque causing the precessional force and re-establish the desired attitude of the platform 12. Conversely, a force tending to cause a bank to the right would be manifested by nose low attitude and cause the drop of mercury 171 to move forwardly and make an electrical contact between the conductor 173 and 179. The conductor 179 is connected with the motor 177 so as to effect movement of the second track 167 to the left and re-establish the desired attitude.

In like manner, a force tending to cause a nose low attitude of the platform 12 would be reflected by a bank to the left. Consequently, the mercury drop 181 would establish an electrical circuit between conductors 183 and 185. The conductor 185 is connected with the motor 187 so as to effect movement of the load carrying compartment 17 on the carriage 53 rearwardly. Conversely, a force tending to cause a nose high attitude would be manifested as a bank to the right. Consequently, the mercury 181 would move to the right to establish an electrical circuit between the conductors 183 and 191. The conductor 191 is connected with the motor 187 so as to effect movement of the carriage 53 and, consequently, the load carrying compartment 17 forwardly of the second track 167 and, hence, forwardly of the platform 12.

If desired, instead of the mercury switches, there may be employed a pitch and roll gyroscope having electrical contacts disposed along mutually perpendicular radials aligned as are the axes of the mercury switches.

GENERAL AND MISCELLANEOUS

Many equivalent devices and structures may be employed for those described hereinbefore.

While electrically operated gyroscopes have been described hereinbefore, any other suitable form may be employed. For example, pneumatically powered gyros may be employed.

Although spongee cord tethers 59 have been described hereinbefore, the tethers may comprise suitable members engaged in orientable slots that will accommodate the movement of the load carrying compartment to a plurality of successive second locations as needed to re-establish the desired attitude of the platform 12.

Instead of gears and if the load is not too heavy, the azimuth orienting means may simply employ a pulley that is fixed to the pivot axis of the turntable and connected by an endless lineal member, such as a belt or a chain, with a driving sprocket or pulley that is powered by an electric motor.

While a cable traversing respective pulleys and connected at respective power and idler pulleys and connected with a carriage 53 have been described, any other means may be employed to move the carriage 53 longitudinally of the track means. For example, a threaded screw may be rotated by an electric motor and the carriage moved longitudinally thereof by a nut means affixed to the carriage. On the other hand, a suitable rack and pinion may be employed, the rack being carried by the track and the pinion being carried by the carriage and powered by an electric motor thereon.

If desired, a timing chain could be employed instead of the interconnection cable 119 for maintaining the control set of contacts synchronized with the track 67. On the other hand, suitable autosyn-selsyn arrangement with servos may be employed for effecting the slaved, or synchronized, orientation of the two.

Any number of contacts 125 and switch moving means 127 may be employed. The same number of each are employed such that there is a one-to-one interconnection therebetween.

Superficially, it appears that the interpositioning of the stabilizing gyro and the respective controls and shifting means to shift the load carrying compartment is unnecessarily elaborate; but, in fact, there is an enhanced stability achieved. Moreover, the structure is more economical than the expensive rotors and the pitch changing means employed heretofore; and there is much less control required of the pilot, as indicated hereinbefore. Also, this invention may be widely used in stabilizing other types of platforms.

Whereas tiltable reaction devices, or propelling means have been described for full flexibility of operation, fixed reaction devices may be employed and this invention used to advantage therewith. Moreover, while powered propellors have been illustrated and described hereinbefore as the reaction devices, jet engines may be employed as the reaction devices in this invention.

From the foregoing it can be seen that this invention accomplishes the objects set out hereinbefore, and provides practical stabilizing systems that are widely useful and advantageous.

Although this invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:

1. Apparatus for stabilizing a platform comprising:
    a. a stabilizing gyroscope including a substantially horizontal rotor for stabilizing said platform and adapted for converting a disturbing force into a precessing force;
    b. a frame carrying said stabilizing gyroscope securely mounted without gimbals at a set first location such that the axis of the rotor of said gyroscope is fixed with respect to said frame so as to effect a dominant precessing force offset 90° in the direction of rotation responsive to said disturbing force at a first azimuth that induces a torque force on said axis of rotation in any direction from zero to 360° in a horizontal plane about a predetermined center of said platform;
    c. a load carrying compartment;
    d. shifting means for shifting said load carrying compartment to move its center of gravity to a plurality of successive second locations and azimuths with respect to said frame to offset to a desired degree the torque force and the reactive precessing force; said shifting means carrying said load carrying compartment and being carried by said frame; and
    e. control means for detecting a slight change in attitude of said platform from a desired attitude, and a second azimuth of a force effecting a raising of a portion of said platform and causing said change in attitude and effecting via said shifting means a controlled shifting of said load carrying compartment to a new second location along a third azimuth offset from said second azimuth 90° in a direction opposite the direction of rotation of said stabilizing gyroscope to establish the desired attitude; said control means being carried on said frame and connected with said shifting means so as to effect energization thereof for positioning said load carrying compartment at a new second location.

2. The apparatus of claim 1 wherein a lifting means is connected with said frame for lifting said platform.

3. The apparatus of claim 2 wherein said control means includes movably mounted controls for effecting a desired attitude responsive to a sensed precessing force from a given direction acting on the top of the axis of said substantially horizontal rotor by moving said load carrying compartment along a radial displaced 90° from said precessing force opposite the direction of rotation of said substantially horizontal rotor of said stabilizing gyroscope.

4. The apparatus of claim 1 wherein said shifting means includes a track means for carrying said load carrying compartment; an azimuth orienting means for orienting said track means at any azimuth, said azimuth orienting means being carried by said frame and carrying said track means; and longitudinal moving means for moving said load carrying compartment in either direction longitudinally of said track means.

5. The apparatus of claim 4 wherein said control means comprises a universally movably mounted gyroscope having an extension having an electrically conductive periphery connected for effecting a completed circuit and a signal upon touching a contact; a set of a plurality of contacts and null points; said set being connected with said track means in a follower relationship so as to maintain the same azimuth orientation with respect to said track means as said track means rotates; said set also being connected with said frame so as to be responsive to change in attitude of said frame; each said contact being connected with said azimuth orienting means for effecting rotation of said track means in a respective direction; said null points allowing said track means to maintain its attained azimuth; and a second set of electrical contacts disposed circumferentially about an extension of a universally mounted gryoscope and connected with said frame so as to be responsive to change of attitude of said frame; each said second contact being connected with a switch means via a switch moving means so as to effect movement of said load carrying compartment in a direction displaced 90° with respect to said second contact, opposite the direction of rotation of said stabilizing gyroscope.

6. The apparatus of claim 5 wherein a lifting means is connected with said frame for lifting said platform and said platform is stabilized by movement of said load carrying compartment with respect to said frame, without requiring modifying said lifting means to effect stabilization.

7. The apparatus of claim 1 wherein said shifting means comprises first and second track means for positioning said load carrying compartment; said first and second track means being oriented at 90° with respect to each other; said first track means being carried by said frame and carrying the second track means; said second track means carrying said load carrying compartment; said first track means having a first longitudinal moving means for moving said second track means longitudinally thereof; and said second track means having a second longitudinal moving means for moving said load carrying compartment longitudinally thereof.

8. The apparatus of claim 7 wherein said control means includes a plurality of switch means that are connected respectively with said longitudinal moving means and are mounted so as to detect the direction of departure of the attitude of said platform from the desired attitude with respect to the respective axes of said track means and effect respective movement of said load carrying compartment respectively along said track means in the proper direction.

9. The apparatus of claim 8 wherein said switch means includes two mercury switches mounted with their respective axes parallel with the respective axes of said track means and are electrically connected at each end with respective longitudinal moving means so as to effect a complete electrical circuit and activate respective said longitudinal moving means until said desired attitude is restored.

* * * * *